(12) United States Patent
De Jong et al.

(10) Patent No.: US 10,053,205 B2
(45) Date of Patent: Aug. 21, 2018

(54) PRESSURE BULKHEAD AND METHOD FOR PRODUCING A PRESSURE BULKHEAD

(71) Applicant: Airbus Operations GmbH, Hamburg (DE)

(72) Inventors: Claas De Jong, Hamburg (DE); Markus Mueller, Hamburg (DE); Karim Grase, Hamburg (DE); Matthias Jessrang, Hamburg (DE); Thomas Konsolke, Hamburg (DE); Lars Fiedler, Hamburg (DE); Jelle Bloemhof, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 242 days.

(21) Appl. No.: 15/082,530

(22) Filed: Mar. 28, 2016

(65) Prior Publication Data

US 2016/0288897 A1 Oct. 6, 2016

(30) Foreign Application Priority Data

Apr. 1, 2015 (DE) .................. 10 2015 205 934

(51) Int. Cl.
*B64C 1/10* (2006.01)
*B29C 70/20* (2006.01)
*B29C 70/30* (2006.01)
*B64F 5/00* (2017.01)

(52) U.S. Cl.
CPC .............. *B64C 1/10* (2013.01); *B29C 70/202* (2013.01); *B29C 70/30* (2013.01); *B64F 5/00* (2013.01); *Y02T 50/433* (2013.01)

(58) Field of Classification Search
CPC ......... B29C 70/202; B29C 70/30; B64C 1/10; B64F 5/00
See application file for complete search history.

(56) References Cited

U.S. PATENT DOCUMENTS

| | | | | |
|---|---|---|---|---|
| 6,378,805 B1 * | 4/2002 | Stephan | ............ | B64C 1/10 244/117 R |
| 7,900,405 B1 * | 3/2011 | Jacoby | ............ | E04B 7/105 210/163 |
| 9,187,168 B2 * | 11/2015 | Rosman | ............ | B64C 1/10 |
| 9,776,704 B1 * | 10/2017 | Rufino | ............ | B64C 1/10 |
| 2008/0149769 A1 * | 6/2008 | Koch | ............ | B64C 1/062 244/121 |
| 2008/0179459 A1 * | 7/2008 | Garcia Laja | ...... | B64C 1/10 244/119 |
| 2014/0370227 A1 * | 12/2014 | Diep | ............ | B64D 45/00 428/66.4 |

FOREIGN PATENT DOCUMENTS

| DE | 19503939 | | 6/1996 | |
|---|---|---|---|---|
| DE | 19503939 C1 * | 6/1996 | ......... | B29C 53/602 |

OTHER PUBLICATIONS

German Search Report, dated Sep. 17, 2015, priority document.

* cited by examiner

*Primary Examiner* — Justin M Benedik

(74) *Attorney, Agent, or Firm* — Greer, Burns & Crain Ltd.

(57) ABSTRACT

A pressure bulkhead comprises a plurality of material plies arranged one above the other, wherein each material ply contains reinforcing fibers embedded in a matrix material. The reinforcing fibers, in at least one first material ply are oriented in such a manner that their longitudinal axes lie in an angle range of ±2° about a radial direction of the pressure bulkhead.

20 Claims, 4 Drawing Sheets

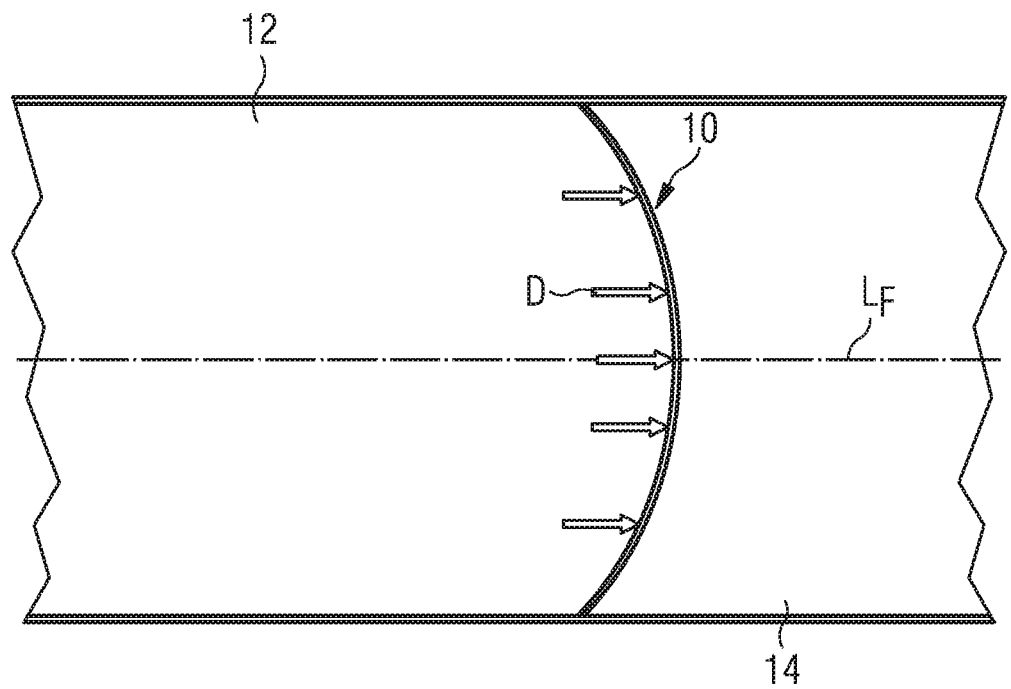

Orientation of the longitudinal axes of the fibers

Orientation of the longitudinal axes of the fibers

Orientation of the longitudinal axes of the fibers

Orientation of the longitudinal axes of the fibers

PRESSURE BULKHEAD AND METHOD FOR PRODUCING A PRESSURE BULKHEAD

CROSS-REFERENCES TO RELATED APPLICATIONS

This application claims the benefit of the German patent application No. 10 2015 205 934.0 filed on Apr. 1, 2015, the entire disclosures of which are incorporated herein by way of reference.

BACKGROUND OF THE INVENTION

The invention relates to a pressure bulkhead which is suitable, in particular, for axially sealing off in a pressure-tight manner, a pressurizable fuselage region, and to a method for producing such a pressure bulkhead.

In aircraft construction, increasingly efforts are being made to use as load-bearing structural components which are made completely or partially of fiber reinforced composites, for example carbon fiber reinforced plastics (CRP). For example, DE 195 03 939 C1 describes a dome-shaped pressure bulkhead which is produced by winding onto a molded body a thread- or ribbon-shaped semi-finished product which has been preimpregnated by the prepreg or wet technique. The semi-finished product can contain carbon fibers, glass fibers or aramid fibers as the main constituent. The winding angle is varied continuously during the winding operation in order to obtain a desired orientation of the semi-finished product and a desired wall thickness of the resulting laminate.

SUMMARY OF THE INVENTION

The invention is directed to an object of providing a pressure bulkhead produced from a fiber composite, which pressure bulkhead, as regards its mechanical properties, satisfies the requirements made of a pressure bulkhead suitable for use in an aircraft and at the same time has a low weight. The invention is further directed to an object of providing a method for producing such a pressure bulkhead.

When used in an aircraft, a pressure bulkhead serves to seal off a pressurizable fuselage region from a fuselage region which is adjacent to the pressurizable fuselage region in the direction of a longitudinal axis of the aircraft and which is subjected to the ambient pressure even when the aircraft is in flight. In order to optimize the load bearing capacity, the pressure bulkhead may be dome-shaped, that is to say, a surface of the pressure bulkhead that faces the pressurizable fuselage region when the pressure bulkhead is fitted in an aircraft may be provided with a concave curvature, while a surface of the pressure bulkhead that is remote from the pressurizable fuselage region may have a corresponding convex curvature. When the pressurizable fuselage region is pressurized, pressure then acts upon the surface of the pressure bulkhead provided with a concave curvature. However, the pressure bulkhead may also have a flat geometry or be only slightly curved. In the region of its peripheral edge, the pressure bulkhead is preferably connected to the primary structure of the aircraft. Consequently, when the pressure bulkhead is pressurized, the pressure bulkhead is subjected mainly to radially directed tensile stresses.

The pressure bulkhead comprises a plurality of material plies arranged one above the other, each material ply containing reinforcing fibers embedded in a matrix material. The reinforcing fibers may be carbon fibers but also glass fibers or aramid fibers. The matrix material employed in the fiber composite used to produce the pressure bulkhead may be a curable plastics material, for example a resin, in particular an epoxy resin. The matrix of the fiber composite may be formed by curing an impregnation of the matrix material applied to the surfaces of the reinforcing fibers and/or by introducing the matrix material in the liquid state into a mold, into which reinforcing fibers have been placed.

In at least one first material ply, substantially all of the reinforcing fibers are oriented in such a manner that their longitudinal axes lie in an angle range of ±2° about a radial direction of the pressure bulkhead. In other words, the pressure bulkhead contains in the at least one first material ply, reinforcing fibers which are oriented in such a manner that the orientation of their longitudinal axes corresponds to the radial direction of the pressure bulkhead and thus to the main direction of loading of the pressure bulkhead with tensile stresses. The reinforcing fibers are therefore particularly suitable for absorbing those tensile stresses. Consequently, the pressure bulkhead, which, as regards its mechanical properties, satisfies all the requirements made of a pressure bulkhead suitable for use in an aircraft, can be produced with less material and consequently a low weight.

The at least one first material ply preferably comprises a plurality of planar elements which each comprise strip-shaped segments arranged parallel to one another. Each strip-shaped segment may be oriented in such a manner that its longitudinal axis lies in an angle range of ±2° about the radial direction of the pressure bulkhead. The production of the at least one first material ply from planar elements which each comprise strip-shaped segments arranged parallel to one another can be carried out relatively simply and inexpensively using existing machines.

The length of the strip-shaped segments forming a planar element preferably decreases in the peripheral direction of the pressure bulkhead, starting from a central axis of the planar element defined by the radial direction of the pressure bulkhead. By means of such a form of the strip-shaped segments, it is possible to produce a first material ply which at least largely covers the entire surface.

The at least one first material ply may further comprise a plurality of planar elements having the shape of a sector of a circle. The first material ply may comprise only planar elements comprising strip-shaped segments arranged parallel to one another or only planar elements having the shape of a sector of a circle. It is, however, also conceivable to form the pressure bulkhead with at least one first material ply which comprises both planar elements comprising strip-shaped segments and planar elements having the shape of a sector of a circle.

The planar elements of the first material ply comprising strip-shaped segments arranged parallel to one another and/or the planar elements having the shape of a sector of a circle of the first material ply preferably have edge regions which overlap in the peripheral direction of the pressure bulkhead. Overlapping regions may be formed by planar elements comprising strip-shaped segments that are mutually adjacent in the peripheral direction of the pressure bulkhead or by planar elements having the shape of a sector of a circle that are mutually adjacent in the peripheral direction of the pressure bulkhead. If the first material ply comprises both planar elements comprising strip-shaped segments and planar elements having the shape of a sector of a circle, overlapping edge regions may also be formed by planar elements comprising strip-shaped segments and planar elements having the shape of a sector of a circle that are mutually adjacent in the peripheral direction.

The pressure bulkhead may further comprise at least one second material ply. For example, first and second material plies may be stacked alternately one above the other in the pressure bulkhead. It is, however, also conceivable to arrange a second material ply between two stacks of material plies each comprising a plurality of first material plies, or to position a stack of material plies comprising a plurality of second material plies between two single first material plies. The order in which the first and second material plies are stacked may be adapted, in particular, in dependence on the specific mechanical requirements that are made of the pressure bulkhead. In the at least one second material ply, substantially all of the reinforcing fibers are preferably oriented in such a manner that their longitudinal axes lie in an angle range of from 88 to 92° to the radial direction of the pressure bulkhead. The second material ply consequently may contain reinforcing fibers which are oriented in such a manner that their longitudinal axes extend substantially perpendicularly to the radial direction of the pressure bulkhead and thus perpendicularly to the main direction of loading of the pressure bulkhead with tensile stresses. The at least one second material ply is therefore not as suitable as the first material ply for absorbing the radially directed tensile stresses. However, the second material ply thus also experiences less expansion than the first material ply and is therefore particularly suitable for compensating for material expansions which occur in the first material ply as a result of the tensile stress acting upon the first material ply.

The at least one second material ply may comprise a plurality of ribbon-shaped planar elements which are arranged concentrically to one another. The ribbon-shaped planar elements may be in the form of concentric circular ribbons or may extend over only a sector of a circle in the peripheral direction of the pressure bulkhead.

The at least one second material ply may further comprise a plurality of planar elements having the shape of a sector of a circle. The second material ply may comprise only ribbon-shaped planar elements or only planar elements having the shape of a sector of a circle. It is, however, also conceivable to form the pressure bulkhead with at least one second material ply which comprises both ribbon-shaped planar elements which extend over only a sector of a circle in the peripheral direction of the pressure bulkhead, and planar elements having the shape of a sector of a circle.

The ribbon-shaped planar elements of the second material ply preferably have edge regions which overlap in the radial direction of the pressure bulkhead. The edge regions which overlap in the radial direction of the pressure bulkhead may be formed by ribbon-shaped planar elements which are mutually adjacent in the radial direction of the pressure bulkhead. In addition or alternatively, the planar elements having the shape of a sector of a circle of the second material ply may have edge regions which overlap in the peripheral direction of the pressure bulkhead.

The pressure bulkhead may further comprise at least one third material ply which may be stacked in a desired stacking order with first and optionally also second material plies. In the at least one third material ply, the reinforcing fibers are preferably oriented in such a manner that their longitudinal axes lie in an angle range of from 15 to 75° to the radial direction of the pressure bulkhead. The third material ply consequently may contain reinforcing fibers which are oriented in such a manner that their longitudinal axes extend at an angle of from 15 to 75° to the radial direction of the pressure bulkhead and thus at an angle of from 15 to 75° to the main direction of loading of the pressure bulkhead with tensile stresses. The at least one third material ply is therefore not as suitable as the first material ply for absorbing the radially directed tensile stresses, but is better than the second material ply. However, the third material ply is less suitable than the second material ply for compensating for material expansions that occur in the first material ply. The number of first, second and third material plies contained in the pressure bulkhead and the order in which they are stacked may be chosen in dependence on the specific mechanical requirements that are made of the pressure bulkhead.

The at least one third material ply may comprise a plurality of strip-shaped planar elements. Mutually adjacent strip-shaped planar elements preferably form different angles with the radial direction of the pressure bulkhead. With such positioning of the strip-shaped planar elements, the strip-shaped planar elements overlie one another in the region of the center of the pressure bulkhead, so that the region of the pressure bulkhead close to the center is reinforced and stiffened.

The at least one third material ply may further comprise a plurality of planar elements having the shape of a sector of a circle. The third material ply may comprise only strip-shaped planar elements or only planar elements having the shape of a sector of a circle. It is, however, also conceivable to form the pressure bulkhead with at least one third material ply which comprises both strip-shaped planar elements and planar elements having the shape of a sector of a circle.

The strip-shaped planar elements of the third material ply and/or the planar elements having the shape of a sector of a circle of the third material ply preferably have edge regions which overlap in the peripheral direction of the pressure bulkhead. Overlapping edge regions may be formed by strip-shaped planar elements that are mutually adjacent in the peripheral direction of the pressure bulkhead or by planar elements having the shape of a sector of a circle that are mutually adjacent in the peripheral direction of the pressure bulkhead. If the third material ply comprises both strip-shaped planar elements and planar elements having the shape of a sector of a circle, overlapping edge regions may also be formed by strip-shaped planar elements and planar elements having the shape of a sector of a circle that are mutually adjacent in the peripheral direction of the pressure bulkhead.

In a method for producing a pressure bulkhead, a plurality of material plies are arranged one above the other. Each material ply contains reinforcing fibers embedded in a matrix material. The reinforcing fibers in at least one first material ply are oriented in such a manner that their longitudinal axes lie in an angle range of ±2° about a radial direction of the pressure bulkhead.

In at least one second material ply, the reinforcing fibers may be oriented in such a manner that their longitudinal axes lie in an angle range of from 88 to 92° to the radial direction of the pressure bulkhead. In addition or alternatively, the reinforcing fibers in at least one third material ply may be oriented in such a manner that their longitudinal axes lie in an angle range of from 15 to 75° to the radial direction of the pressure bulkhead. The first, the second and/or the third material ply may be formed as described above.

BRIEF DESCRIPTION OF THE DRAWINGS

A preferred embodiment of the invention will now be explained in greater detail with reference to the accompanying schematic drawings, in which:

FIG. 1 is a schematic representation of a dome-shaped pressure bulkhead,

DETAILED DESCRIPTION OF THE PREFERRED EMBODIMENTS

Figure 2A:
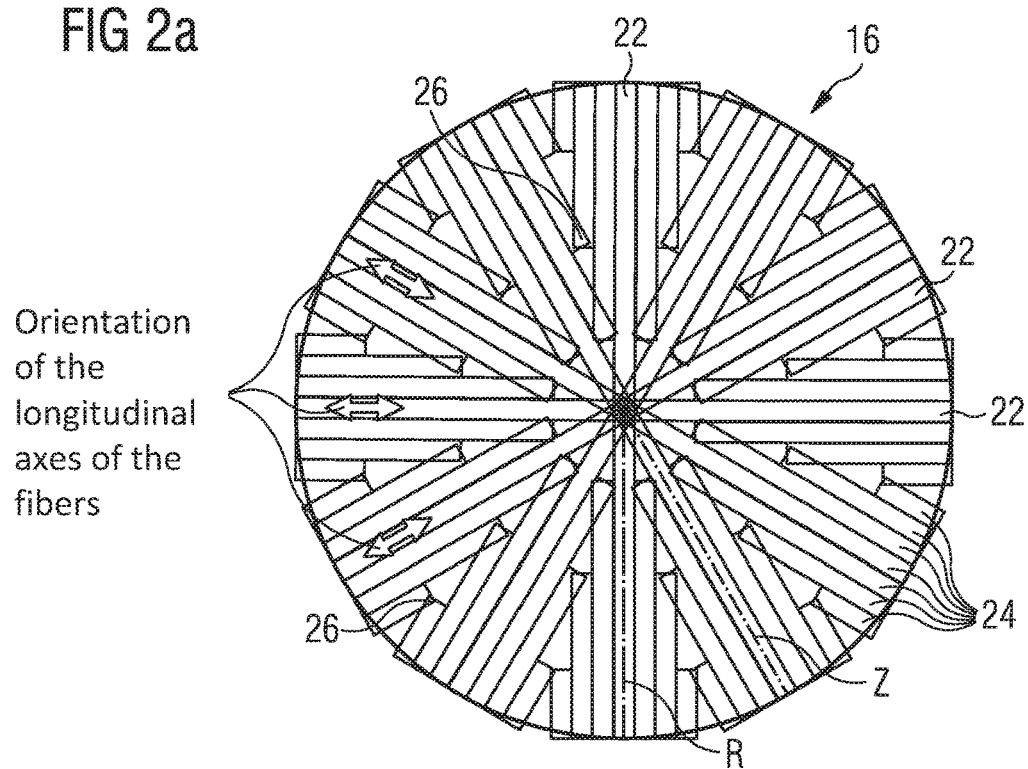
FIGS. 2a and 2b show two variants of a first material ply suitable for producing a pressure bulkhead according to FIG. 1, FIGS. 3a and 3b show two variants of a second material ply suitable for producing a pressure bulkhead according to FIG. 1, and FIGS. 4a and 4b show two variants of a third material ply suitable for producing a pressure bulkhead according to FIG. 1.

A pressure bulkhead 10 shown in FIG. 1 serves to seal off a pressurizable fuselage region 12 from a fuselage region 14 which is adjacent to the pressurizable fuselage region 12 in the direction of a longitudinal axis LF of the aircraft and which is subjected to the ambient pressure even when the aircraft is in flight. When the aircraft is at cruising altitude, and a higher pressure consequently prevails in the pressurizable fuselage region 12 than in the fuselage region 14 subjected to the ambient pressure, a pressure D determined by the difference between the pressure in the pressurizable fuselage region 12 and the pressure in the fuselage region 14 subjected to the ambient pressure acts upon a surface of the pressure bulkhead facing the pressurizable fuselage region 12. In the embodiment shown in FIG. 1, the pressure bulkhead 10 has a dome shape, the surface of the pressure bulkhead 10 facing the pressurizable fuselage region 12 being concavely curved. The pressure bulkhead 10 is connected in the region of its peripheral edge to the primary structure of the aircraft (not shown in FIG. 1). When the pressure D acts upon the pressure bulkhead 10, the pressure bulkhead is consequently subjected mainly to radially directed tensile stresses.

The pressure bulkhead 10 comprises a plurality of material plies arranged one above the other. In particular, the pressure bulkhead 10 comprises a plurality of first material plies 16 shown in FIGS. 2a and 2b, a plurality of second material plies 18 shown in FIGS. 3a and 3b, and a plurality of third material plies 20 shown in FIGS. 4a and 4b. The number of first, second and third material plies 16, 18, 20 in the pressure bulkhead 10 and the order in which they are stacked are adapted to the specific mechanical requirements made of the pressure bulkhead 10 and may be varied as required and according to the specific requirement profile.

Each of the material plies 16, 18, 20 contains reinforcing fibers embedded in a matrix material. The reinforcing fibers may be carbon fibers but also glass fibers or aramid fibers. There may be used as the matrix material a curable plastics material, for example a resin, in particular an epoxy resin. The matrix of the fiber composite may be formed by curing an impregnation of the matrix material applied to the surfaces of the reinforcing fibers, and/or by introducing the matrix material in the liquid state into a mold into which the reinforcing fibers have been placed.

Figure 2B:
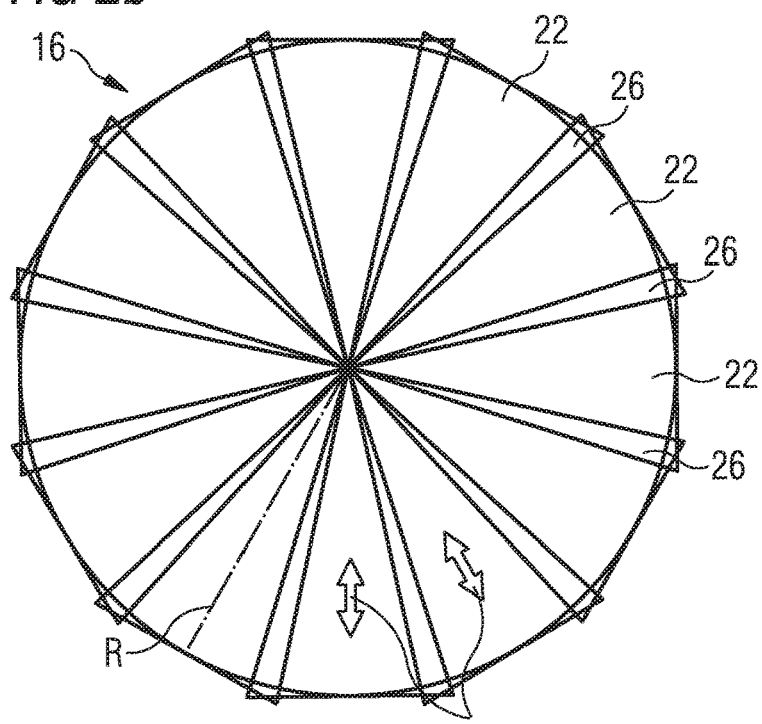

In the first material ply 16 illustrated in FIGS. 2a and 2b, the reinforcing fibers are oriented in such a manner that their longitudinal axes lie in an angle range of ±2° about a radial direction R of the pressure bulkhead. The first material ply 16 thus contains reinforcing fibers which are oriented in such a manner that the orientation of their longitudinal axes corresponds to the radial direction R of the pressure bulkhead 10 and thus to the main direction of loading of the pressure bulkhead 10 with tensile stresses. The reinforcing fibers are therefore particularly suitable for absorbing those tensile stresses.

In the arrangement according to FIG. 2a, the first material ply 16 comprises a plurality of planar elements 22 which each comprise strip-shaped segments 24 arranged parallel to one another. Each strip-shaped segment 24 is oriented in such a manner that its longitudinal axis lies in an angle range of ±2° about the radial direction R of the pressure bulkhead 10, the length of the strip-shaped segments 24 forming a planar element 22 decreasing in the peripheral direction of the pressure bulkhead 10, starting from a central axis Z of the planar element 22 defined by the radial direction R of the pressure bulkhead 10. The planar elements 22 of the first material ply 16 have edge regions 26 which overlap in the peripheral direction of the pressure bulkhead 10, which edge regions are formed by corresponding portions of mutually adjacent planar elements 22.

In the arrangement according to FIG. 2b, the first material ply 16 comprises a plurality of planar elements 22 having the shape of a sector of a circle. Also in the variant according to FIG. 2b, the planar elements 22 of the first material ply 16 have edge regions 26 which overlap in the peripheral direction of the pressure bulkhead 10, which edge regions are formed by corresponding portions of mutually adjacent planar elements 22.

In addition to the arrangements illustrated in FIGS. 2a and 2b, a configuration of the first material ply 16 with both planar elements 22 comprising strip-shaped segments 24 arranged parallel to one another and planar elements 22 having the shape of a sector of a circle is conceivable.

Figure 3A:
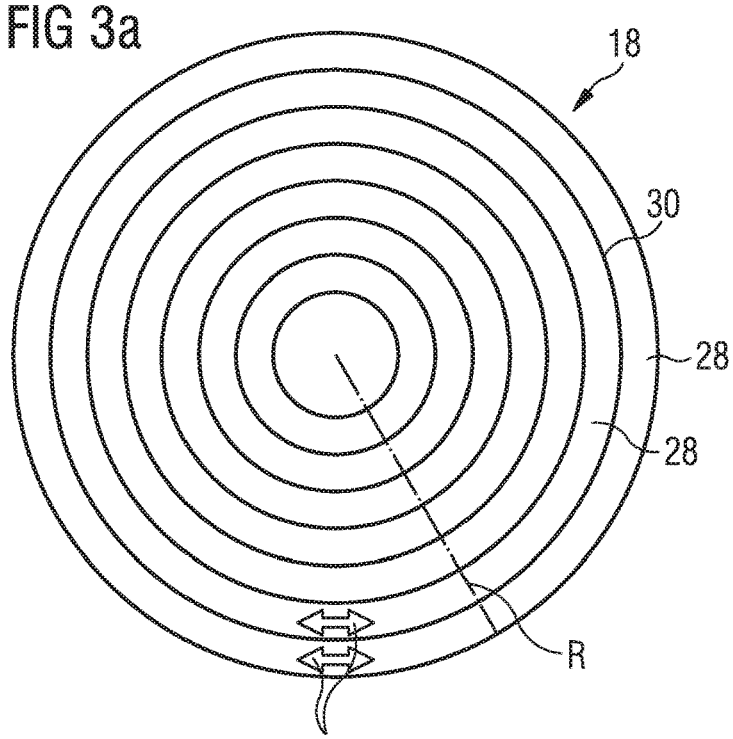
Figure 3B:
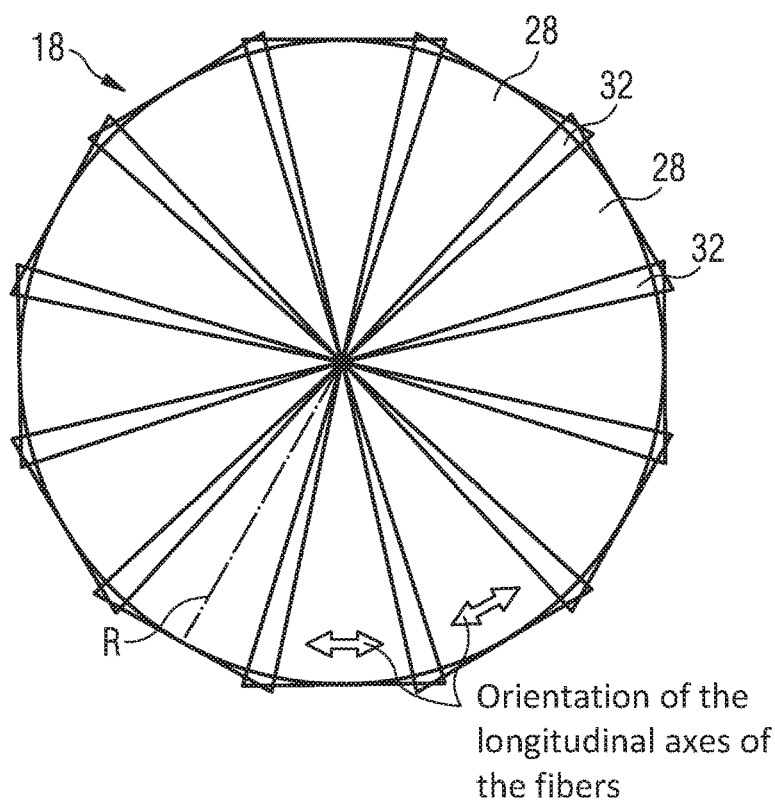

In the second material ply 18 illustrated in FIGS. 3a and 3b, the reinforcing fibers are oriented in such a manner that their longitudinal axes lie in an angle range of from 88 to 92° to the radial direction R of the pressure bulkhead 10. The second material ply 18 consequently contains reinforcing fibers which are oriented in such a manner that their longitudinal axes extend substantially perpendicularly to the radial direction R of the pressure bulkhead 10 and thus perpendicularly to the main direction of loading of the pressure bulkhead 10 with tensile stresses. The second material ply 18 is therefore not as suitable as the first material ply 16 for absorbing the radially directed tensile stresses. However, it is able to compensate for material expansions which occur in the first material ply 16 as a result of the tensile stress acting upon the first material ply 16.

In the arrangement according to FIG. 3a, the second material ply 18 comprises a plurality of ribbon-shaped planar elements 28 which are arranged concentrically to one another and are in the form of concentric circular ribbons. The ribbon-shaped planar elements 28 of the second material ply 18 have edge regions 30 which overlap in the radial direction R of the pressure bulkhead 10, which edge regions are formed by ribbon-shaped planar elements 28 that are mutually adjacent in the radial direction R of the pressure bulkhead 10.

In the arrangement according to FIG. 3b, the second material ply 18 comprises a plurality of planar elements 28 having the shape of a sector of a circle. In the variant according to FIG. 3b, the planar elements 28 of the second material ply 18 have edge regions 32 which overlap in the peripheral direction of the pressure bulkhead 10, which edge regions are formed by corresponding portions of mutually adjacent planar elements 28.

In addition to the arrangements illustrated in FIGS. 3a and b, a configuration of the second material ply 18 with both ribbon-shaped planar elements 28, which extend over only a sector of a circle in the peripheral direction of the pressure bulkhead 10, and planar elements 28 having the shape of a sector of a circle is conceivable.

Figure 4A:
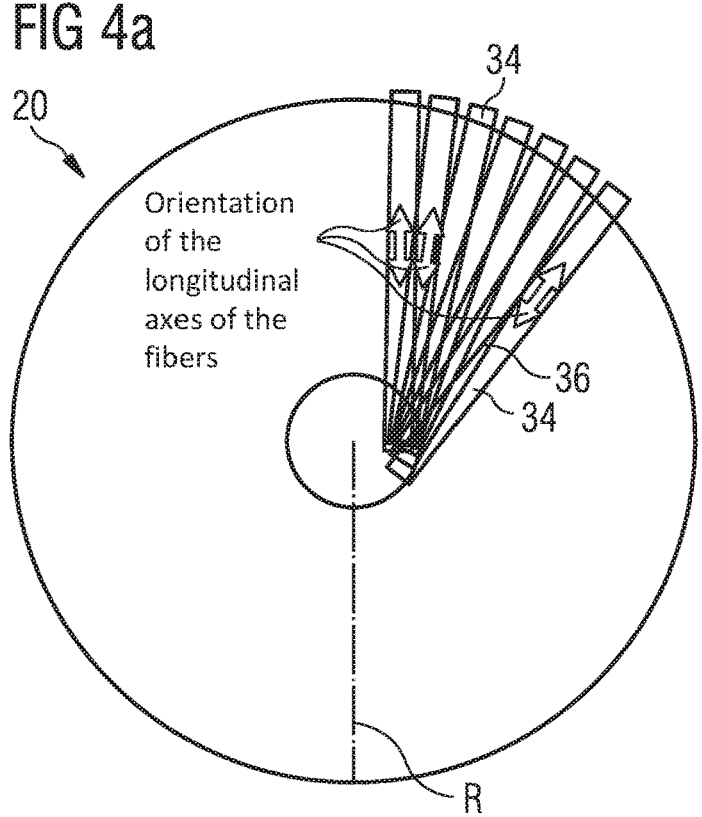

In the third material ply 20 illustrated in FIGS. 4a and b, the reinforcing fibers are oriented in such a manner that their longitudinal axes lie in an angle range of from 15 to 75° to the radial direction R of the pressure bulkhead 10. The third material ply 20 consequently contains reinforcing fibers which are oriented in such a manner that their longitudinal axes extend at an angle of from 15 to 75° to the radial direction R of the pressure bulkhead 10 and thus at an angle of from 15 to 75° to the main direction of loading of the pressure bulkhead 10 with tensile stresses. The third material ply 20 is therefore not as suitable as the first material ply 16 for absorbing the radially directed tensile stresses, but is better than the second material ply 18. However, the third material ply 20 is less suitable than the second material ply 18 for compensating for material expansions which occur in the first material ply 16.

In the arrangement according to FIG. 3a, the third material ply 20 comprises a plurality of strip-shaped planar elements 34. Mutually adjacent strip-shaped planar elements 34 form different angles with the radial direction R of the pressure bulkhead 10, so that the strip-shaped planar elements 34 overlie one another in the region of the center of the pressure bulkhead 10, as a result of which the region of the pressure bulkhead 10 close to the center is reinforced and stiffened. The strip-shaped planar elements 34 of the third material ply 20 also have edge regions 36 which overlap in the peripheral direction of the pressure bulkhead 10, which edge regions are formed by strip-shaped planar elements 34 which are mutually adjacent in the peripheral direction of the pressure bulkhead 10.

Figure 4B:
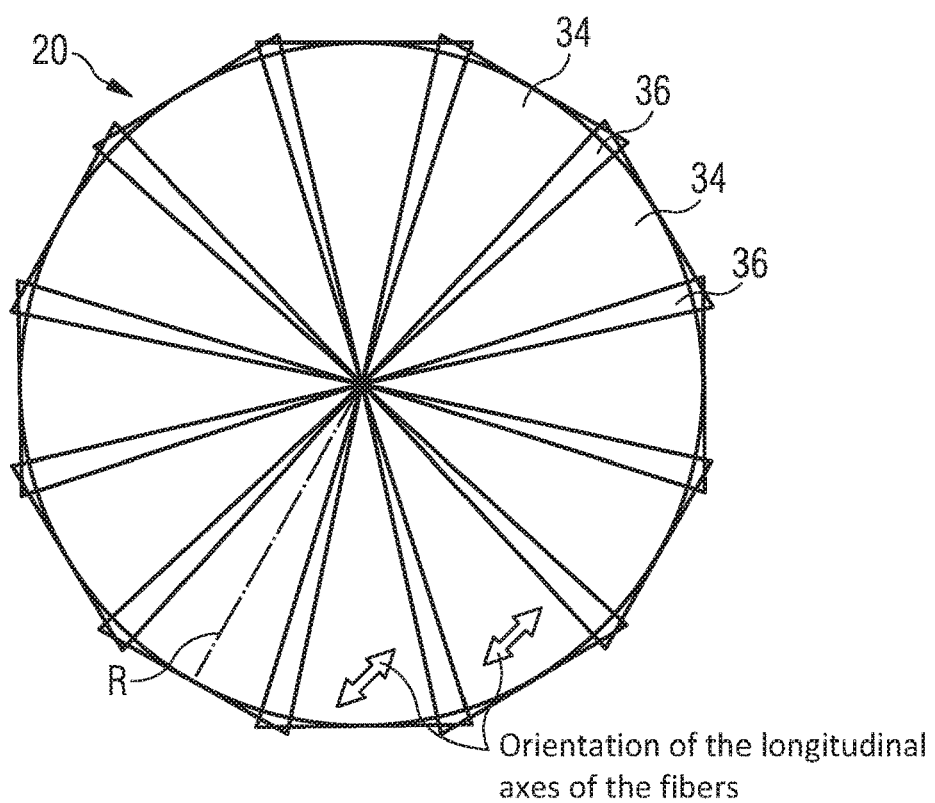

In the arrangement according to FIG. 4b, the third material ply 20 comprises a plurality of planar elements 34 having the shape of a sector of a circle. In the variant according to FIG. 4b, the planar elements 34 of the third material ply 20 have edge regions 36 which overlap in the peripheral direction of the pressure bulkhead 10, which edge regions are formed by corresponding portions of mutually adjacent planar elements 34.

In addition to the arrangements illustrated in FIGS. 4a and b, a configuration of the third material ply 20 with both strip-shaped planar elements 34 and planar elements 34 having the shape of a sector of a circle is also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead comprising a plurality of material plies arranged one above the other, wherein each material ply contains reinforcing fibers embedded in a matrix material, wherein substantially all of the reinforcing fibers in at least one first material ply are oriented in such a manner that their longitudinal axes lie in an angle range of ±2° about a radial direction of the pressure bulkhead, and wherein the at least one first material ply comprises a plurality of planar elements which each comprise strip-shaped segments arranged parallel to one another.

2. The pressure bulkhead according to claim 1, and wherein each strip-shaped segment is oriented in such a manner that its longitudinal axis lies in an angle range of ±2° about the radial direction of the pressure bulkhead.

3. The pressure bulkhead according to claim 1, wherein the length of the strip-shaped segments forming a planar element decreases in the peripheral direction of the pressure bulkhead, starting from a central axis of the planar element defined by the radial direction of the pressure bulkhead.

4. The pressure bulkhead according to claim 1, wherein the at least one first material ply further comprises a plurality of planar elements having the shape of a sector of a circle.

5. The pressure bulkhead according to claim 1, wherein the planar elements of the first material ply comprising strip-shaped segments arranged parallel to one another have edge regions which overlap in the peripheral direction of the pressure bulkhead.

6. The pressure bulkhead according to claim 4, wherein the planar elements having the shape of a sector of a circle of the first material ply have edge regions which overlap in the peripheral direction of the pressure bulkhead.

7. The pressure bulkhead according to claim 1, wherein the reinforcing fibers in at least one second material ply are substantially all oriented in such a manner that their longitudinal axes lie in an angle range of from 88 to 92° to the radial direction of the pressure bulkhead.

8. The pressure bulkhead according to claim 7, wherein the at least one second material ply comprises a plurality of ribbon-shaped planar elements which are arranged concentrically to one another.

9. The pressure bulkhead according to claim 7, wherein the at least one second material ply contains a plurality of planar elements having the shape of a sector of a circle.

10. The pressure bulkhead according to claim 8, wherein the ribbon-shaped planar elements of the second material ply have edge regions which overlap in the radial direction of the pressure bulkhead.

11. The pressure bulkhead according to claim 9, wherein the planar elements having the shape of a sector of a circle of the second material ply have edge regions which overlap in the peripheral direction of the pressure bulkhead.

12. The pressure bulkhead according to claim 1, wherein the reinforcing fibers in at least one third material ply are oriented in such a manner that their longitudinal axes lie in an angle range of from 15 to 75° to the radial direction of the pressure bulkhead.

13. The pressure bulkhead according to claim 12, wherein the at least one third material ply comprises a plurality of strip-shaped planar elements, and wherein mutually adjacent strip-shaped planar elements form different angles with the radial direction of the pressure bulkhead.

14. The pressure bulkhead according to claim 12, wherein the at least one third material ply contains a plurality of planar elements having the shape of a sector of a circle.

15. The pressure bulkhead according to claim 13, wherein the strip-shaped planar elements of the third material ply have edge regions which overlap in the radial direction of the pressure bulkhead.

16. The pressure bulkhead according to claim 10, wherein the planar elements having the shape of a sector of a circle of the third material ply have edge regions which overlap in the peripheral direction of the pressure bulkhead.

17. A method for producing a pressure bulkhead in which a plurality of material plies are arranged one above the other, wherein each material ply contains reinforcing fibers embedded in a matrix material, comprising the step of orienting substantially all of the reinforcing fibers in at least one first material ply in such a manner that their longitudinal axes lie in an angle range of ±2° about a radial direction of the pressure bulkhead, wherein the at least one first material ply comprises a plurality of planar elements which each comprise strip-shaped segments arranged parallel to one another.

18. The method according to claim 17, comprising a further step of orienting substantially all of the reinforcing fibers in at least one second material ply in such a manner that their longitudinal axes lie in an angle range of from 88 to 92° to the radial direction of the pressure bulkhead.

19. The method according to claim 17, comprising a further step of orienting the reinforcing fibers in at least one third material ply in such a manner that their longitudinal axes lie in an angle range of from 15 to 75° to the radial direction of the pressure bulkhead.

20. A pressure bulkhead comprising a plurality of material plies arranged one above the other, wherein each material ply contains reinforcing fibers embedded in a matrix material, wherein substantially all of the reinforcing fibers in at least one first material ply are oriented in such a manner that their longitudinal axes lie in an angle range of ±2° about a radial direction of the pressure bulkhead, and wherein the at least one first material ply comprises a plurality of planar elements having the shape of a sector of a circle.

* * * * *